United States Patent
Waibel

(10) Patent No.: US 9,028,213 B2
(45) Date of Patent: May 12, 2015

(54) CULINARY WHISK

(75) Inventor: Patrick Waibel, Kowloon (HK)

(73) Assignee: Maxpat Trading and Marketing (Far East) Limited, Hong Kong (HK)

( * ) Notice: Subject to any disclaimer, the term of this patent is extended or adjusted under 35 U.S.C. 154(b) by 148 days.

(21) Appl. No.: 13/453,255

(22) Filed: Apr. 23, 2012

(65) Prior Publication Data

US 2013/0058183 A1    Mar. 7, 2013

(30) Foreign Application Priority Data

Sep. 1, 2011   (GB) .................................. 1115081.0

(51) Int. Cl.
*A47J 43/10*    (2006.01)

(52) U.S. Cl.
CPC .................................. *A47J 43/1093* (2013.01)

(58) Field of Classification Search
CPC .................................................... A47J 43/1093
USPC .......................... 366/129, 342–343; 416/70 R
See application file for complete search history.

(56) References Cited

U.S. PATENT DOCUMENTS

| | | | |
|---|---|---|---|
| 1,213,561 A * | 1/1917 | Walker | 416/70 R |
| 3,133,976 A | 5/1964 | Gross | |
| 2005/0083777 A1 * | 4/2005 | Browne | 366/129 |
| 2006/0256644 A1 | 11/2006 | Browne et al. | |
| 2008/0034981 A1 | 2/2008 | Mayer | |

FOREIGN PATENT DOCUMENTS

| | | | |
|---|---|---|---|
| CH | 170402 | * | 7/1934 |
| DE | 20305630 | | 8/2004 |
| FR | 351195 | A | 7/1905 |
| FR | 2605870 | | 5/1986 |
| GB | 268684 | | 4/1927 |
| WO | 2010/130826 | A2 | 11/2010 |
| WO | 2011058234 | | 5/2011 |

OTHER PUBLICATIONS

Translation of CH170402.*

* cited by examiner

*Primary Examiner* — David Sorkin
*Assistant Examiner* — Abbas Rashid
(74) *Attorney, Agent, or Firm* — Heslin Rothenberg Farley & Mesiti, P.C.

(57) ABSTRACT

There is provided a culinary whisk comprising a body including a handle portion and a utility portion connected to the handle portion. The utility portion has a number of loops formed from a plurality of wires, wherein at least one of the wires is provided with a first portion having a non-circular cross section.

6 Claims, 2 Drawing Sheets

CULINARY WHISK

CROSS REFERENCE TO RELATED APPLICATION

This application claims benefit of priority from Great Britain Patent Application No. GB 1115081.0 filed Sep. 1, 2011. The entire contents of the prior application are incorporated herein by reference.

FIELD OF THE INVENTION

The present invention is concerned with a culinary utensil and in particular a culinary whisk for mixing foodstuff or mixing liquid foodstuff.

BACKGROUND OF THE INVENTION

There are a variety of culinary whisks. Conventional whisks typically have a utility portion made of a number of wire loops. For example, the utility portion may have six wire loops. When a large container of foodstuff (e.g. egg, batter) is to be mixed, a larger whisk is usually used. One disadvantage of using a conventional whisk is that it takes considerable time to mix the foodstuff thoroughly. This creates difficulties to those who are in a hurry in preparing food or have weaker hands and cannot perform the mixing exercise for a prolong period of time.

One way to address such problem would be to increase the number of the wire loops to, for example, eight or nine with a view to increase the efficiency of a whisking exercise. However, increasing the number of wires still might not increase the efficiency significantly and it would create other technical problems during manufacturing or problems during cleaning after use.

The present invention seeks to address the above problems or at least to provide an alternative to the public.

SUMMARY OF THE INVENTION

According to a first aspect of the present invention, there is provided a culinary whisk comprising a body including a handle portion and a utility portion connected to the handle portion, the utility portion having a number of loops formed from a plurality of wires, wherein at least one said wire is provided with a first portion having a non-circular cross section and a second portion having a non-circular cross section, said first portion is provided with a substantially flat surface on at least one side thereof and said second portion is provided with a substantially flat surface on at least one side thereof, and wherein the substantially flat surface of said first portion and the substantially flat surface of said second portion define planes which are substantially perpendicular to each other. With such configuration, the surface area of said first portion is significantly enlarged and increased when compared with if the first portion had a circular cross section.

Preferably, the body may generally be elongate in shape, with the handle portion arranged at one end and the utility portion arranged at the opposite end.

The loops may be configured into a balloon shape.

The first portion may be provided with a substantially flat surface on at least one side thereof. In a specific embodiment, the first portion may be provided with two such flat surfaces arranged on opposite sides thereof.

The wire has the second portion with the non-circular section such that the surface area thereof is enlarged. In a specific embodiment, the second portion may be provided with two such flat surfaces arranged on opposite sides thereof.

In one embodiment, the first portion may be relatively and sufficiently thin and generally define a first plane. The second portion may also be relatively and sufficiently thin and generally define a second plane. The first plane and the second plane may intersect with each other perpendicularly.

In a preferred embodiment, the wire may have a plurality of the first portions and a plurality of the second portions. Specifically, the first portions and the second portions may be arranged alternatively along the at least one wire.

In another embodiment, the whisk may comprise a plurality of the at least one wires.

According to a second aspect of the present invention, there is provided a culinary whisk comprising a plurality of wires configured into a number of wire loops forming a utility portion of the whisk for mixing foodstuffs, wherein a first portion of at least of one wire loop is formed by undergoing a process of changing a cross section thereof from, for example, circular to non-circular by crimping, stamping or molding whereby surface area of the first portion is increased.

Preferably, the at least one wire may have a second portion having a non-circular cross section.

In an embodiment, the whisk may comprise a plurality of the first portions and a plurality of the second portions arranged alternatively along the at least one wire.

According to a third aspect of the present invention, there is provided a method of making a culinary whisk, comprising the steps of providing a number of wires, and treating at least one wire such that cross section of at least a portion of the wire be transformed to non-circular for increasing surface area thereof.

BRIEF DESCRIPTION OF DRAWINGS

Some embodiments of the present invention will now be explained, with reference to the accompanied drawings, in which:—

DETAILED DESCRIPTION OF PREFERRED EMBODIMENTS OF THE INVENTION

Figure 1:
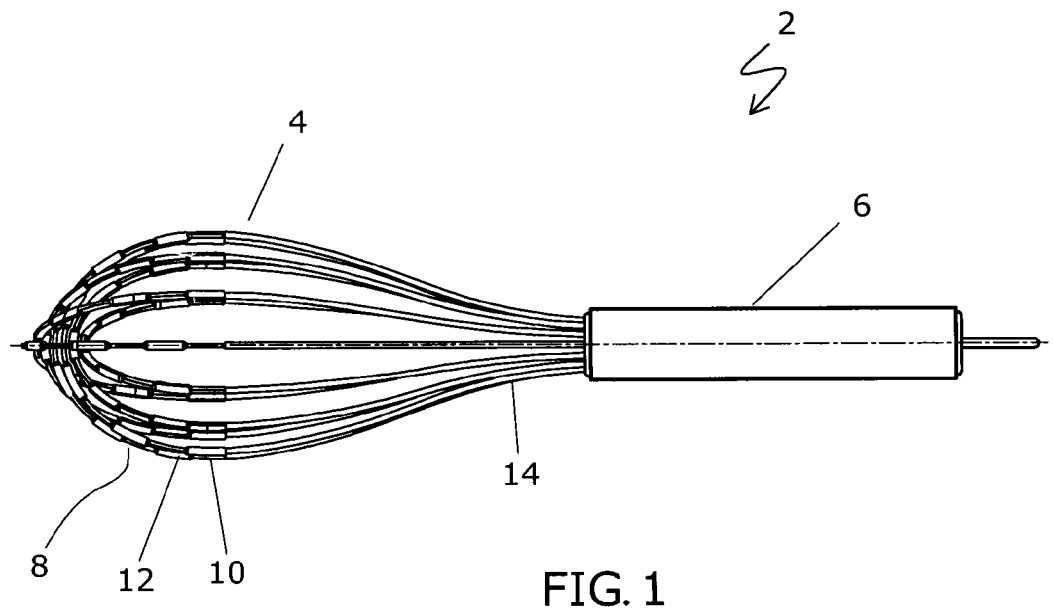
FIG. 1 is a side view of a culinary whisk according to an embodiment of the present invention.

FIG. 1 shows a side view of a culinary whisk generally designated 2. The whisk comprises a utility portion 4 at a front end connected to a handle portion 6 at the rear end.

Figure 3A:
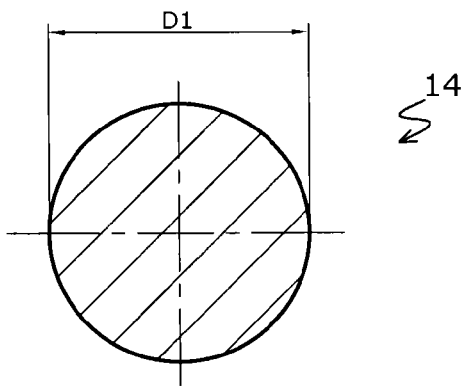
FIG. 3*a* is a schematic cross section view of a third region of wire of the whisk of FIG. 1.

The utility portion 4 is made of seven wire loops 8 formed into a balloon shape which in use is inserted in a container for mixing foodstuff therein. Each wire loop 8 is bent such that the opposite ends are brought together and are connected to the front end of the handle portion 6. Each wire loop 8 has three regions or portions 10, 12, 14, with different configurations. Specifically, there is provided a third region 14 located at the opposite ends of the wire loop 8. The third region 14 is typical in that it is configured such that the cross section thereof is essentially circular. Please see FIG. 3*a*. Most metal wires forming such loops have a circular cross section and no additional processing is usually needed to conform the third region 14 to a circular cross section. In this embodiment, the diameter D1 of the third region 14 of the wire loop is about 1.6 mm. In other words, the surface area of a specific length of the third region 14 of the wire loop 8, l, is "$2\pi D/2 \cdot l$" or "5 mm·l".

Figure 3B:
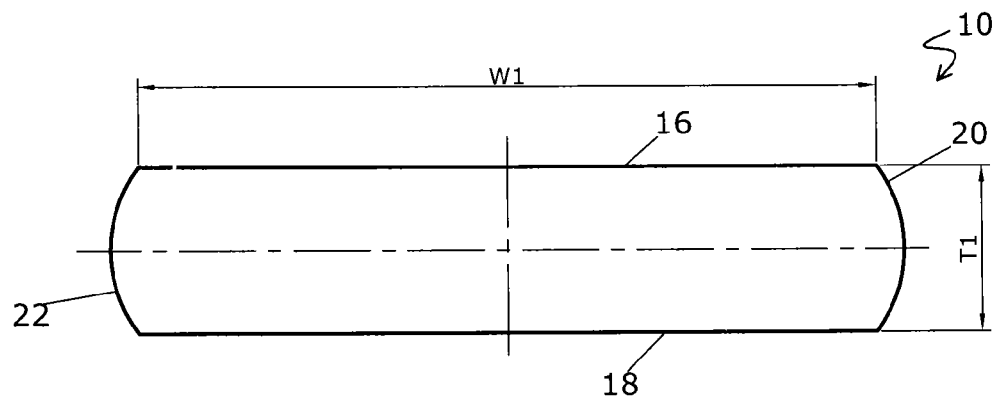
FIG. 3*b* is a schematic cross section view of a first region of the wire of the whisk of FIG. 1.

There is provided a number of first regions 10 located at various locations towards the front end of the utility portion 4 along the wire loop 8. Each first region 10 is configured such that, when compared with the third region 14, the cross section thereof is non-circular. Please see FIG. 3b. In particular, the cross section has two substantially flat or planar surfaces 16, 18 on opposite sides of the first region 10. There are also two slightly curved and narrow surfaces 20, 22 on the other opposite sides. In this embodiment, each of the two substantially flat surfaces 16, 18 has a width W1 of about 2 mm, and a thickness T1 of about 1 mm. In other words, the surface area of a specific length of the first region 10 of the wire loop 8, l, is "6 mm·l".

Figure 3C:
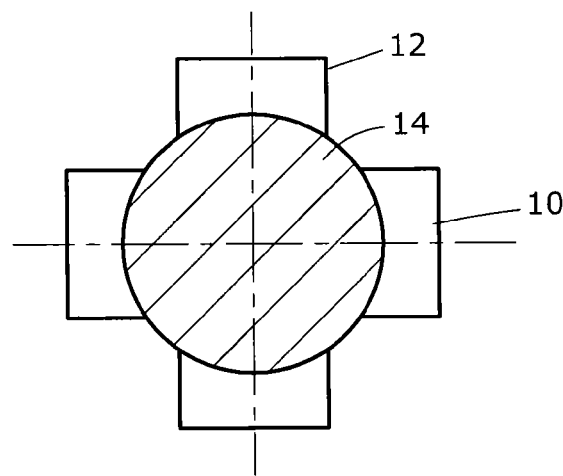
FIG. 3*c* is a schematic view showing the arrangement of the first region, a second region and the third region when the wire is straightened and viewed from an end.

There is provided a number of second regions 12 also located at various locations towards the front end of the utility portion 4 along the wire loop 8. The second regions 12 and the first regions 10 are generally similar in terms of dimensions. However, the orientation of the second regions 12 is different from that of the first regions 10. In this embodiment, each first region 10 and its adjacent second region 12 are arranged such that they are offset at 90°. Please see FIG. 3c. In other words, the substantially flat surface 16 of the first region 10 and the substantially flat surface of the second region 12 define two planes which are perpendicularly to each other.

Figure 2:
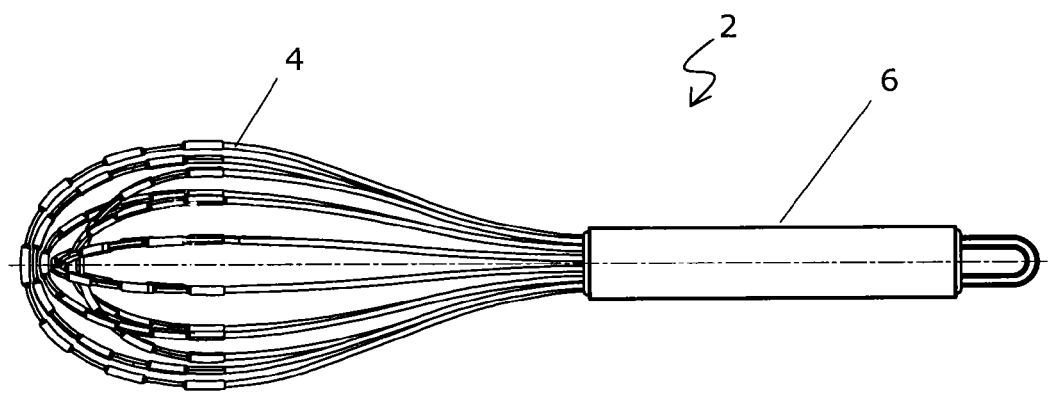
FIG. 2 is another side view of the whisk of FIG. 1.

In this embodiment, there is provided a number of the first regions 10 and the second regions 12. These first regions 10 and second regions 12 are arranged alternatively. Please see FIGS. 1 and 2.

It is to be understood that due to the provision of the first regions 10 and the second regions 12 (which would otherwise be a typical wire with a circular cross section), the surface area of each wire loop 8 is increased. In this embodiment, the increase in surface area of the first and second regions 10, 12 is actually about 20%. The increase in surface area means that the area that the whisking wires are in connect with foodstuff is also increased by 20%, translating to more efficiency in a whisking exercise. With this arrangement, a user would need to whisk less or fewer number of times and still can achieve the same results. Or when the user whisks the same number of times using the whisk 2, when compared to using a conventional whisk without the novel wire configuration a significantly better or efficient whisking result can be achieved. Experiments have shown that a whisk made in accordance with the present invention can accomplish whisking of various foodstuff, and in particular liquid foodstuff such as egg or butter significantly more efficiently.

In the above embodiment, each first 10 or second 12 region has been configured such that the wire 8 has a width of about 2 mm and a thickness of about 1 mm, in other embodiments the wire may be processed further such that the surface area of each of the first and second regions is further enlarged. This may be achieved, for example, by pressing each (first and/or second) region further to generate even wider or broader surfaces on opposite sides of the region. In one embodiment, the regions may be processed such that they are so thin that they resemble a sheet with minimal thickness and can essentially define one plane. When they are very thin, the surface area of the regions can be increased even further. Alternatively, the surfaces may be processed to generate a corrugated surface to increase the surface area. When the surface area of the wire loops is increased, the whisking effect is enhanced.

In the above embodiment, the first 10 and second 12 regions are arranged alternately. However, in other embodiments, the first and second regions may be arranged differently. For example, each pair of adjacent first and second regions may be offset by 60° and not 90°.

The first 10 and second 12 regions may be formed by a number of ways. In this embodiment, the first 10 and second 12 regions are formed by crimping the wire 8 at the predetermined locations. However, in other embodiments, the regions may be formed by stamping. Alternatively, the regions may be formed by the wire having the particular configurations of first and second regions molded from a molding machine. It is to be noted that in these embodiments no additional number of wire loops are required and as such there would not be an additional material cost. There would also not be technical problems of connecting more wire loops to the handle whisk has a predefined or fixed diameter. Further, the surface area of each wire loops can be increased with a lower manufacturing cost in that a simple wire is subject to a manufacturing process effectively and efficiently.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

The invention claimed is:

1. A culinary whisk comprising a body including a handle portion and a utility portion connected to the handle portion, said utility portion having a number of loops formed from a plurality of wires, wherein at least one of said wires is provided with different portions with different profiles along longitudinal length of said at least one wire, the different portions including a first portion having a generally rectangular cross section, a second portion having a generally rectangular cross section, and a third portion having a circular cross section, wherein said first portion is provided with two flat surfaces arranged on opposite sides thereof and said second portion is provided with two flat surfaces arranged on opposite sides thereof, wherein at least one of the flat surfaces of said first portion and at least one of the flat surfaces of said second portion define planes substantially perpendicular to each other, wherein said at least one wire has a plurality of said first portions and a plurality of said second portions, wherein said first portions and said second portions are arranged alternately along the longitudinal length of said at least one wire.

2. A culinary whisk as claimed in claim 1, wherein said body is generally elongate in shape, with said handle portion arranged at one end and said utility portion arranged at the opposite end.

3. A culinary whisk as claimed in claim 1, wherein said loops are configured into a balloon shape.

4. A culinary whisk as claimed in claim 1, wherein said first and second portions are crimped portions of the wires.

5. A culinary whisk as claimed in claim 1, comprising a plurality of said at least one wire with said first, second, and third portions.

6. A culinary whisk as claimed in claim 2, wherein said loops are configured into a balloon shape.

* * * * *